United States Patent [19]

Nelson

[11] Patent Number: 5,079,389
[45] Date of Patent: Jan. 7, 1992

[54] WIRE GUARD COUPLING

[76] Inventor: Carl A. Nelson, 416 W. Cliff Dr., Santa Cruz, Calif. 95060

[21] Appl. No.: 610,849

[22] Filed: Nov. 5, 1990

[51] Int. Cl.$^5$ .............................................. H02G 3/26
[52] U.S. Cl. .............................................. 174/48; 16/2
[58] Field of Search ............... 174/48, 135; 16/2; 411/548, 339

[56] References Cited

U.S. PATENT DOCUMENTS

| | | | |
|---|---|---|---|
| D. 231,769 | 6/1974 | Searer et al. | 174/48 X |
| 2,870,242 | 1/1959 | Wilkerson | 174/48 X |
| 3,211,824 | 10/1965 | Heiman | 174/48 |
| 3,240,869 | 3/1966 | Jureit | 174/48 X |
| 3,855,413 | 12/1974 | Baillie | 174/48 |
| 4,924,646 | 5/1990 | Marquardt | 174/48 X |

Primary Examiner—Harold Broome
Assistant Examiner—David A. Tone

[57] ABSTRACT

A wire guard coupler for shielding and retaining wires in buildings and the like comprises a first tapered cylindrical member having a tapered track member on a first side thereof and a longitudinal slot on a second side thereof. A second tapered cylindrical member is adapted to slideably fit with said first cylindrical member and has a tapered track member and a longitudinal slot correspondingly positioned with said track and slot on said first cylindrical member. In a preferred embodiment said first cylindrical member has a tang integral with said tapered track for locking said coupler in place and both cylinders are flared at a larger end thereof. The coupler is preferably manufactured by stamping and rolling sheet metal into the desired configuration.

14 Claims, 1 Drawing Sheet

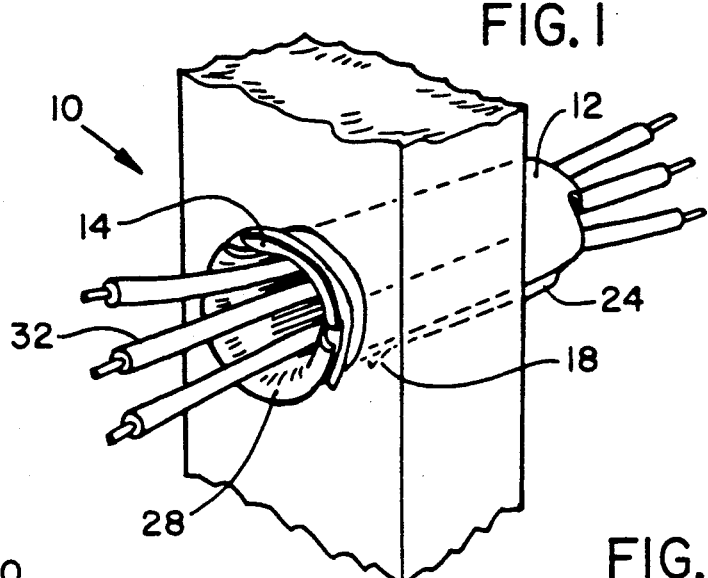
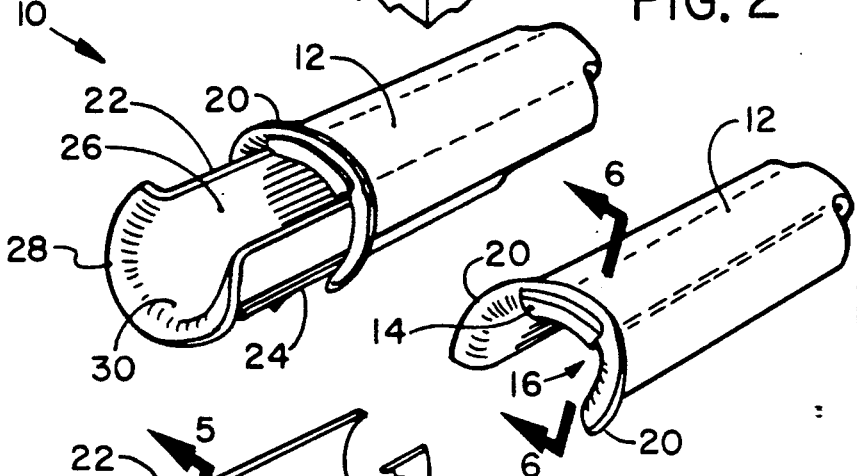
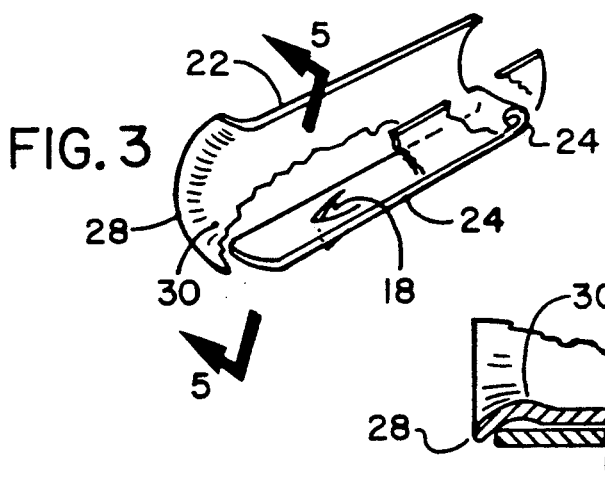
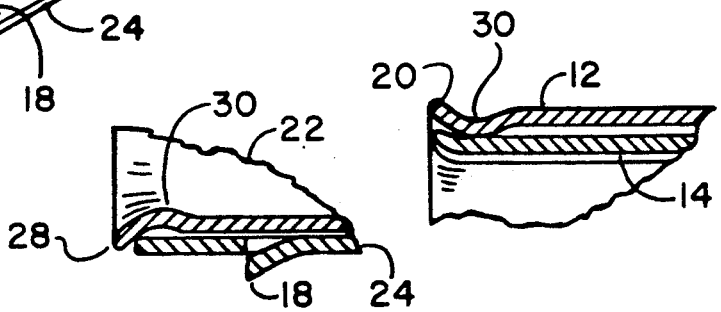

WIRE GUARD COUPLING

BACKGROUND OF THE INVENTION

1. Field of Invention

This invention relates to wire protectors of the type used in building construction to protect electrical wiring and like service lines against accidental damage. More particularly, the invention relates to cylindrical wire protectors used in building construction to form a shield or sheath for wires passing through wooden members such as studs, risers, and beams.

2. Description of Prior Art

Wire protectors or couplings are used in building construction to form a shield or sheath around wires passing through wooden frame members. An important need for wire protectors is to prevent wiring from being pierced by nails, screws, or other fasteners. More particularly, after the initial framework is constructed, for example a stud wall, the electrical wiring is run along the surface thereof.

In a conventional wood stud wall, this usually includes a notching or recessing of the face edges of the studs for a somewhat recessed positioning of the wire. To protect the notch-received wire it is a typical expedient to overlay each notch with a flat metal plate which is secured to the corresponding stud both above and below the notch, usually by integral teeth or prongs struck from the plate. In this way an effective protective means is provided against accidental piercing of the wire by nails or the like as the wall-finishing panels are added. Likewise, such nail plates will effectively protect the wire against accidental damage by other fasteners such as used for shelving, placement of utilitarian or decorative articles, or add-ons.

Illustrative of this genre of conventional nail plates is the plate disclosed in U.S. Pat. No. 3,240,869 to Lureit, issued Mar. 15, 1966. Such plates have been used in conjunction with wood stud walls as well as on furred walls for similarly protecting wiring or the like therein. In this type of construction, such walls are normally formed of concrete block or concrete, and have numerous wooden strips, furring strips, nailed thereto making a base for wall-finishing panels, shelving, or the like. Such nail plates suffer significant limitations due to the large surface area used thereby decreasing available nailing area, and the problems encountered by a protruding plate on such construction surface.

Another type of wire protector comprises a cylindrical tube having a welded seam and provided with a flare at one end thereof. The end opposite to the flare is placed at the entrance of the hole and the protector driven fully into the hole.

A still different type of wire protector consists of a simple rectangular sheet of steel rolled to provide an open tapering seam. The narrower end of the seam is placed in the drilled hole and the wire protector driven home. The purpose of the tapered seam is to provide leeway for the hole causing the end being hammered to be forced to contract. Such wire protector suffers serious limitations in that there is a tendency for the protector to shake loose as the wood dries and the protector is subject to vibration.

The invention is directed to a highly reliable, easy to install, and economical wire coupler which gives maximum protection to wires and allows installation when the wires are already in place. In addition a wire coupler is provided which provides for increased nailing space over the prior art and eliminates a protruding plate or the necessity of recessing the same.

SUMMARY OF THE INVENTION

A wire guard coupler for shielding and retaining wires in buildings and the like, comprises a first hollow cylindrical member having a track member on a first side thereof and a longitudinal slot on a second side thereof, a second hollow cylindrical member adapted to slideably fit within said first hollow cylindrical member and having a track member on a first side thereof and a slot on a second side thereof so that when said first and said second cylindrical members are combined a double wall shield is provided for shielding and retaining wires. Preferably the first and the second cylinder are slightly tapered, one fitting snugly inside of the other. The track member of both cylinders are also tapered as are the slots so that the tapers of the slots and tracks expand the cylinders upon insertion and allow the cylinders to fit tightly together and to a structural member.

The cylinders are preferably manufactured by stamping and rolling sheet metal in which the tapered track is extended slightly and then is preferably bent over to the inside of the first cylinder and to the outside of the second cylinder. When assembled the tracks fill the slots of the mating cylinders to form two double walls.

The track member of said first cylinder may further include a small tang angled away from said track and from the direction of insertion. Such tang locks serves to lock the coupler in place within the construction.

The first and second cylinders are preferably flared on their larger end to provide a surface to press or force during installation without deforming any area that may cut and chafe the wiring. Such flares also serve as a stop-locater for the final positioning of the coupler. Such flares may be formed complete when manufactured from the metal at an end of the tracks from an original stamp form.

BRIEF DESCRIPTION OF THE DRAWINGS

FIG. 1 shows a front perspective view of a wire coupler according to the invention.

FIG. 2 shows a right front perspective view of a wire coupler with the two cylindrical members partially separated.

FIG. 3 shows a perspective view of a tapered cylinder according to the invention.

FIG. 4 shows a perspective view of the cylinder which complements the cylinder illustrated in FIG. 3.

FIG. 5 shows a sectional view through 5—5 according to the invention.

FIG. 6 shows a sectional view through 6—6 according to the invention.

Drawing reference numerals:
- 10: wire guard coupler
- 12: tapered cylinder
- 14: track of cylinder 12
- 16: slot in cylinder 12
- 18: tang
- 20: flared lip of cylinder 12
- 22: tapered cylinder
- 24: track of cylinder 22
- 26: slot in cylinder 22
- 28: flared lip of cylinder 22
- 30: depression
- 32: wire.

DETAILED DESCRIPTION OF THE PREFERRED EMBODIMENT

FIG. 1 shows a wire guard coupler 10 according to the preferred embodiment of the invention. The coupler comprises a first hollow cylindrical member 12 having a track member 14 on a first side thereof and a longitudinal slot 16 on a second side thereof. The cylindrical member 12 preferably has a flared lip 20 and a depression. A second hollow cylindrical member 22 is adapted to slideably fit within said first hollow cylindrical member 12 and has a track member 24 on a first side thereof and a slot 26 on a second side thereof. The cylindrical member 22 preferably has a flared lip 28 and a depression 30 as illustrated.

In the preferred embodiment of the invention, said first cylinder 12 and said second cylinder 22 are tapered as shown in FIGS. 2, 3, and 4. Slot 16 and slot 26 are also tapered as are tracks 14 and track 24 so that when assembled the track fill the slots of the mating cylinders to from two double walls. FIGS. 5 and 6 show sectional views of wire guard coupler 10 illustrating the double wall construction when cylinder 12 and cylinder 22 are operably mated.

Track member 24 preferably has a tang member 18 extending from the track which serves to lock and secure the coupler in place within the construction. Cylinders 12 and 22 are preferably flared at a larger end to provide a surface to press or force during installation, as shown in FIGS. 3 and 5. Such flared construction also serves to minimize deforming surrounding areas thereby limiting the possibility of deformed areas cutting or chafing the wiring.

A preferred method of manufacture comprises stamping and rolling sheet metal to include the tapered track members 14 and 24 as part of the original stamping. Such tracks are then preferably bent over to the inside of cylinder 12 and to the outside of cylinder 22. When assembled these tracks fill the slots of the mating cylinders to form two double walls. The wire guard 10 of the instant invention may be constructed in a wide variety of sizes to conform to conventional or unconventional hole sizes used in wall wire installations.

In operation and use wire guard coupler 10 is placed in a selected drilled hole in the construction and through which wire 32 is passed through structural members of the building. The coupler 10, when assembled forms a double walled cylinder as shown in FIG. 2, 5, and 6, thereby giving complete protection against nails, screws, rivets and the like on both sides of the structural member.

In use, said first cylinder 12 is partially inserted into the selected hole and then said second cylinder 22 is slid in place with aligning tracks 14 and 24 in slots 26 and 16. Pressure is preferably applied to said flared ends 20 and 28 and said second cylinder 22 is then pressed until cylinder 12 is flush against the structure with both flared ends now pressed against each other.

If wires 32 are already in place before installation of coupler 10, cylinders 12 and 22 are first placed over the wires using slots 16 and 26 and then the assembled coupler is inserted into the structural member. If the wires 32 are to be installed following the coupler installation, wires 32 are simply fed through either end of the cylinders as required. Complete installation of coupler 10 is may be made from one side of the structural member only, thereby allowing application on corner supports or other areas accessible from only one side of the structure. In this manner installation requires only a minimum amount of skill and training while providing a coupler and wire protector with increased safety, reliability, and versatility.

While the above description contains many specificities, these should not be construed as limitations on the scope of the invention, but merely as exemplifications of preferred embodiments thereof. Those skilled in the art will envision many other possible variations are within its scope. For example, skilled artisans will readily be able to change the dimensions and shapes of the various embodiments. The coupler may be made out of alternative materials, variations on the shape and configuration of the track members or the slots may be made, or many other variations and modifications may be made without departing from the scope of the invention. Accordingly it is requested that the scope of the invention be determined by the appended claims and their legal equivalents, and not by the examples which have been given.

I claim:

1. A wire guard coupler for shielding and retaining wires in buildings and the like, comprising:
   a first hollow cylinder having a track member on a first side thereof and a longitudinal slot on a second side thereof, and
   a second hollow cylinder adapted to slideably fit within said first hollow cylinder and having a track member on a first side thereof and a slot on a second side thereof so that when said first and said second cylinders are combined a double wall shield is provided for shielding and retaining wires.

2. The wire guard coupler of claim 1 wherein said first and said second cylinders are tapered.

3. The wire guard coupler of claim 1 wherein said track members said first and said second cylinders are tapered.

4. The wire guard coupler of claim 1 wherein said slots of said first and said second cylinders are tapered.

5. The wire guard coupler of claim 3 wherein said track member of said second cylinder further comprises a tang member extending from said track member for locking said coupler in place.

6. The wire guard coupler of claim 1 wherein said first and said second cylinders are flared at a larger end thereof.

7. The wire guard coupler of claim 1 wherein said first and said second cylinders are manufactured by stamping and rolling sheet metal.

8. An electrical wire protector for installation in a wooden structural member, which comprises:
   a first cylinder having a track member on a first side thereof and a longitudinal slot on a second side thereof, and
   a second cylinder adapted to slideably fit within said first cylinder and having a track member on a first side thereof and a longitudinal slot on a second side thereof so that when said first and said second cylinders are combined a double wall is provided for shielding and retaining wires.

9. The wire protector of claim 8 wherein said first and said second cylinders are tapered.

10. The wire protector of claim 8 wherein said track members of said first and said second cylinders are tapered.

11. The wire protector of claim 8 wherein said slots of said first and said second cylinders are tapered.

12. The wire protector of claim 10 wherein said track member of said second cylinder further comprises a tang member extending from the track member for locking said protector in place.

13. The wire protector of claim 8 wherein said first and said second cylinders are flared at a larger end thereof.

14. The wire protector of claim 8 wherein said first and said second cylinders are manufactured by stamping and rolling sheet metal.

* * * * *